(12) United States Patent
Cheng et al.

(10) Patent No.: US 11,043,174 B2
(45) Date of Patent: Jun. 22, 2021

(54) PIXEL STRUCTURE, PIXEL ARRAY STRUCTURE, AND RELATED DRIVING METHOD

(71) Applicant: AU Optronics Corporation, Hsin-Chu (TW)

(72) Inventors: Wei-Ming Cheng, Hsin-Chu (TW); Seok-Lyul Lee, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/528,728

(22) Filed: Aug. 1, 2019

(65) Prior Publication Data

US 2020/0302882 A1   Sep. 24, 2020

(30) Foreign Application Priority Data

Mar. 22, 2019   (TW) .................................. 108110146

(51) Int. Cl.
*G09G 3/36*      (2006.01)
*G02F 1/1343*    (2006.01)
(Continued)

(52) U.S. Cl.
CPC ..... *G09G 3/3607* (2013.01); *G02F 1/134309* (2013.01); *G02F 1/136286* (2013.01); *G09G 3/3614* (2013.01); *G09G 3/3648* (2013.01); *G02F 1/1368* (2013.01); *G02F 1/134318* (2021.01); *G02F 2201/121* (2013.01); *G02F 2201/122* (2013.01); *G02F 2201/123* (2013.01);
(Continued)

(58) Field of Classification Search
CPC .. G09G 3/3648; G09G 3/3607; G09G 3/3614; G09G 2300/0439; G02F 1/134309; G02F 2001/134318; G02F 1/1368; G02F 2001/122; G02F 2201/123
See application file for complete search history.

(56) References Cited

U.S. PATENT DOCUMENTS

2010/0001973 A1   1/2010  Hotelling et al.
2012/0249496 A1   10/2012 Pai
(Continued)

FOREIGN PATENT DOCUMENTS

CN      101236318 A     8/2008
CN      102681275 A     9/2012
(Continued)

*Primary Examiner* — Dennis P Joseph
(74) *Attorney, Agent, or Firm* — WPAT, PC

(57) ABSTRACT

A pixel structure includes a switching element, a first electrode, and a second electrode. The first electrode includes two first main portions parallel to an extension direction of the data line, a girder portion coupled between the two first main portions, and two connection portions coupled between the two first main portions. The girder portion and the two connection portions are parallel to an extension direction of the scan line, and the girder portion is disposed between the two connection portions. The second electrode includes a second main portion parallel to the extension direction of the data line, multiple branch portions symmetrically coupled with the second main portion, and two extension portions parallel to the extension direction of the data line. Each of the two extension portions is coupled with two of the multiple branch portions.

3 Claims, 9 Drawing Sheets

(51) Int. Cl.
*G02F 1/1362* (2006.01)
*G02F 1/1368* (2006.01)

(52) U.S. Cl.
CPC ............ *G09G 2320/0238* (2013.01); *G09G 2320/066* (2013.01); *G09G 2330/021* (2013.01)

(56) References Cited

U.S. PATENT DOCUMENTS

| | | | |
|---|---|---|---|
| 2012/0249943 | A1 | 10/2012 | Pai |
| 2013/0293513 | A1 | 11/2013 | Hotelling et al. |
| 2014/0139484 | A1 | 5/2014 | Hotelling et al. |
| 2014/0247247 | A1 | 9/2014 | Hotelling et al. |
| 2015/0309623 | A1 | 10/2015 | Hotelling et al. |
| 2017/0235195 | A1* | 8/2017 | Song ................. G02F 1/136286 349/43 |
| 2019/0384124 | A1* | 12/2019 | Ye ........................ G09G 3/3688 |
| 2020/0050064 | A1 | 2/2020 | Cheng et al. |

FOREIGN PATENT DOCUMENTS

| | | |
|---|---|---|
| CN | 103926759 A | 7/2014 |
| CN | 109100895 A | 12/2018 |
| CN | 109188791 A | 1/2019 |
| TW | I592725 B | 7/2017 |

* cited by examiner

PIXEL STRUCTURE, PIXEL ARRAY STRUCTURE, AND RELATED DRIVING METHOD

CROSS-REFERENCE TO RELATED APPLICATION

This application claims priority to Taiwan Application Serial Number 108110146, filed Mar. 22, 2019, which is herein incorporated by reference in its entirety.

BACKGROUND

Field of Invention

The present disclosure relates to a pixel structure. More particularly, the present disclosure relates to a pixel structure including a first electrode including first main portions, a girder portion, and connection portions and a second electrode including second main portions, branch portions, and extension portions.

Description of Related Art

As industry chains of the virtual reality and e-sports mature, the demand for related display products has gradually increased. Displays used for the virtual reality require high-continuity images to avoid dizziness and enhance the realism of the virtual space. On the other hand, displays used for the e-sports should be able to catch up high-speed operations of the player. Therefore, for liquid crystal displays, how to shorten the response time of liquid crystals is important.

However, liquid crystal displays on the market often sacrifice the transmittance of liquid crystals while shortening the response time of liquid crystals. In order to provide sufficient brightness, these liquid crystal displays need to consume more power for the backlight module.

SUMMARY

The disclosure provides a pixel structure including a switching element, a first electrode, and a second electrode. The first electrode includes two first main portions, a girder portion, and two connection portions. The two first main portions are essentially parallel to a direction in which the data line is extended. The girder portion is coupled between the two first main portions. The two connection portions are coupled between the two first main portions. The girder portion and the two connection portions are essentially parallel to a direction in which the scan line is extended, and the girder portion is disposed between the two connection portions. The second electrode includes a second main portion, multiple branch portions, and two extension portions. The second main portion is essentially parallel to the direction in which the data line is extended. The multiple branch portions are symmetrically coupled with the second main portion. The two extension portions are essentially parallel to the direction in which the data line is extended. Each of the two extension portions is coupled with at least two of the multiple branch portions.

The disclosure provides a pixel array structure including multiple data lines, multiple scan lines, and multiple pixel structures. The multiple data lines are extended along a first direction. The multiple scan lines are extended along a second direction. Each of the multiple pixel structures includes a switching element, a first electrode, and a second electrode. The first electrode includes two first main portion, a girder portion, and two connection portions. The two first main portions are essentially parallel to the first direction. The girder portion is coupled between the two first main portions. The two connection portions are coupled between the two first main portions. The girder portion and the two connection portions are essentially parallel to the second direction, and the girder portion is disposed between the two connection portions. The second electrode includes a second main portion, multiple branch portions, and two extension portions. The second main portion is essentially parallel to the first direction. The multiple branch portions are symmetrically coupled with the second main portion. The two extension portions are essentially parallel to the first direction. Each of the two extension portion is coupled with at least two of the multiple branch portions.

It is to be understood that both the foregoing general description and the following detailed description are by examples, and are intended to provide further explanation of the disclosure as claimed.

DETAILED DESCRIPTION

Figure 1:
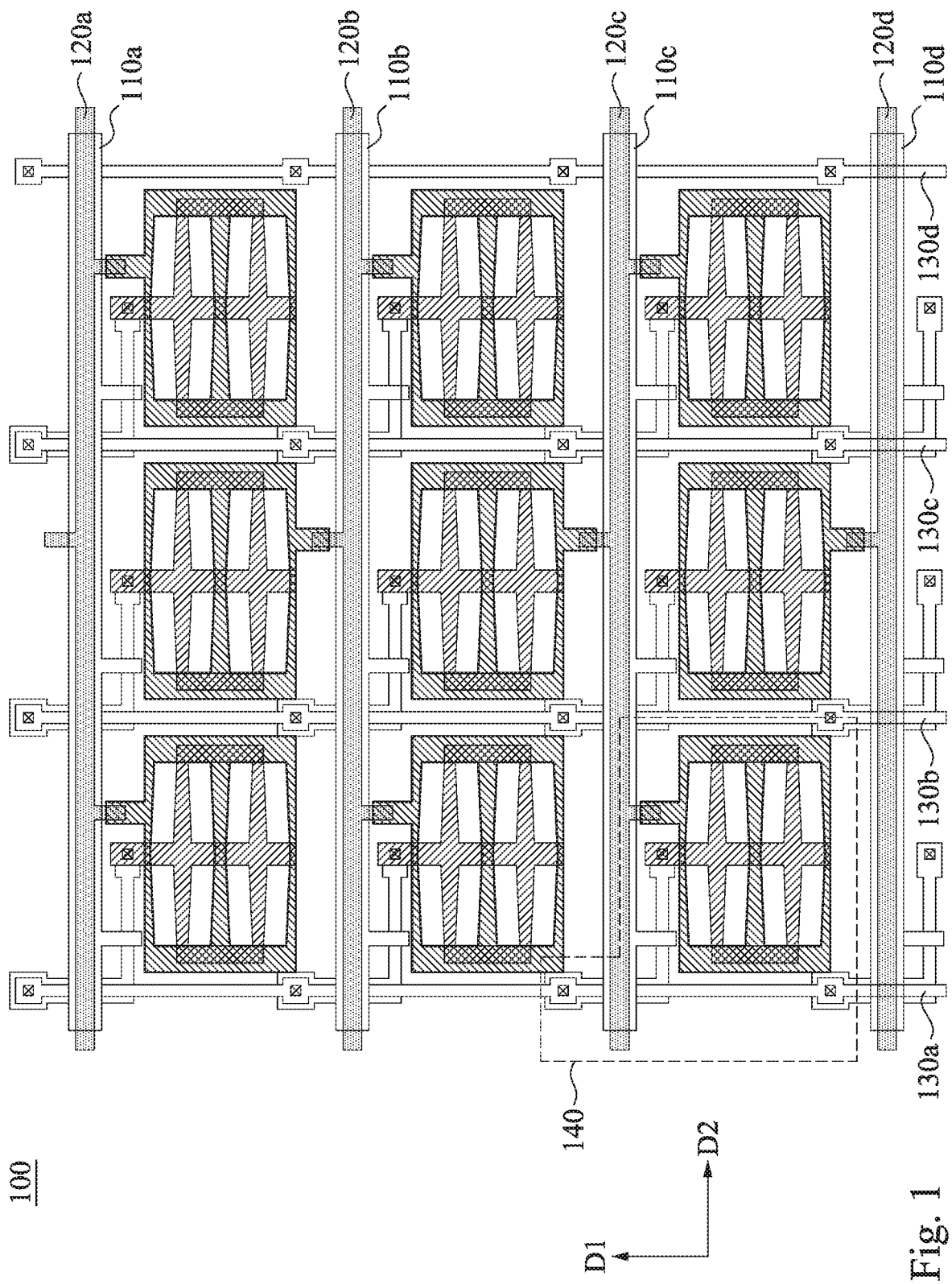
FIG. 1 is a top view diagram of a pixel array structure according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a top view diagram of a pixel array structure 100 according to one embodiment of the present disclosure. The pixel array structure 100 comprises a plurality of scan lines 110a-110d, a plurality of common voltage lines 120a-120d, a plurality of data lines 130a-130d, and a plurality of pixel structures 140. The data lines 130a-130d are extended in parallel to the first direction D1. The scan lines 110d-110d and the common voltage lines 120a-120d are extended in parallel to the second direction D2. The pixel structures 140 are arranged as a plurality of columns parallel to the first direction D1, and also as a plurality of rows parallel to the second direction D2. In this embodiment, the common voltage lines 120a-120d are completely overlapping with the scan lines 110a-110d, respectively, but this disclosure is not limited thereto. In one embodiment, the common voltage lines 120a-120d are partially overlapping with the scan lines 110a-110d, respectively. In another embodiment, the common voltage lines 120a-120d are not overlapping with the scan lines 110a-110d.

The data lines 130a-130d are configured to alternatively receive data signals with different polarities. For example, the data lines 130a and 130c are configured to receive data signals with the same polarity, and the data lines 130b and 130d are configured to receive data signals with another polarity. The common voltage lines 120a-120d are configured to alternatively receive common voltages with different polarities. For example, the common voltage lines 120a and 120c are configured to receive common voltages with the same polarity, and the common voltage lines 120b and 120d are configured to receive common voltages with another polarity. Two pixel structures 140 adjacent in the first direction D1 or the second direction D2 are coupled with two different ones of the common voltage lines 120a-120d, respectively.

For example, with respect to a pixel structure 140 disposed between the common voltage lines 120b and 120c and also between the data lines 130b and 130c, the pixel structure 140 is coupled with the common voltage lines 120c. Two pixel structures 140, which are adjacent to the aforesaid pixel structure 140 in the first direction D1, are coupled with the common voltage lines 120b and 120d, respectively. Two pixel structures 140, which are adjacent to the aforesaid pixel structure 140 in the second direction D2, are together coupled with the common voltage line 120b.

Figure 2:
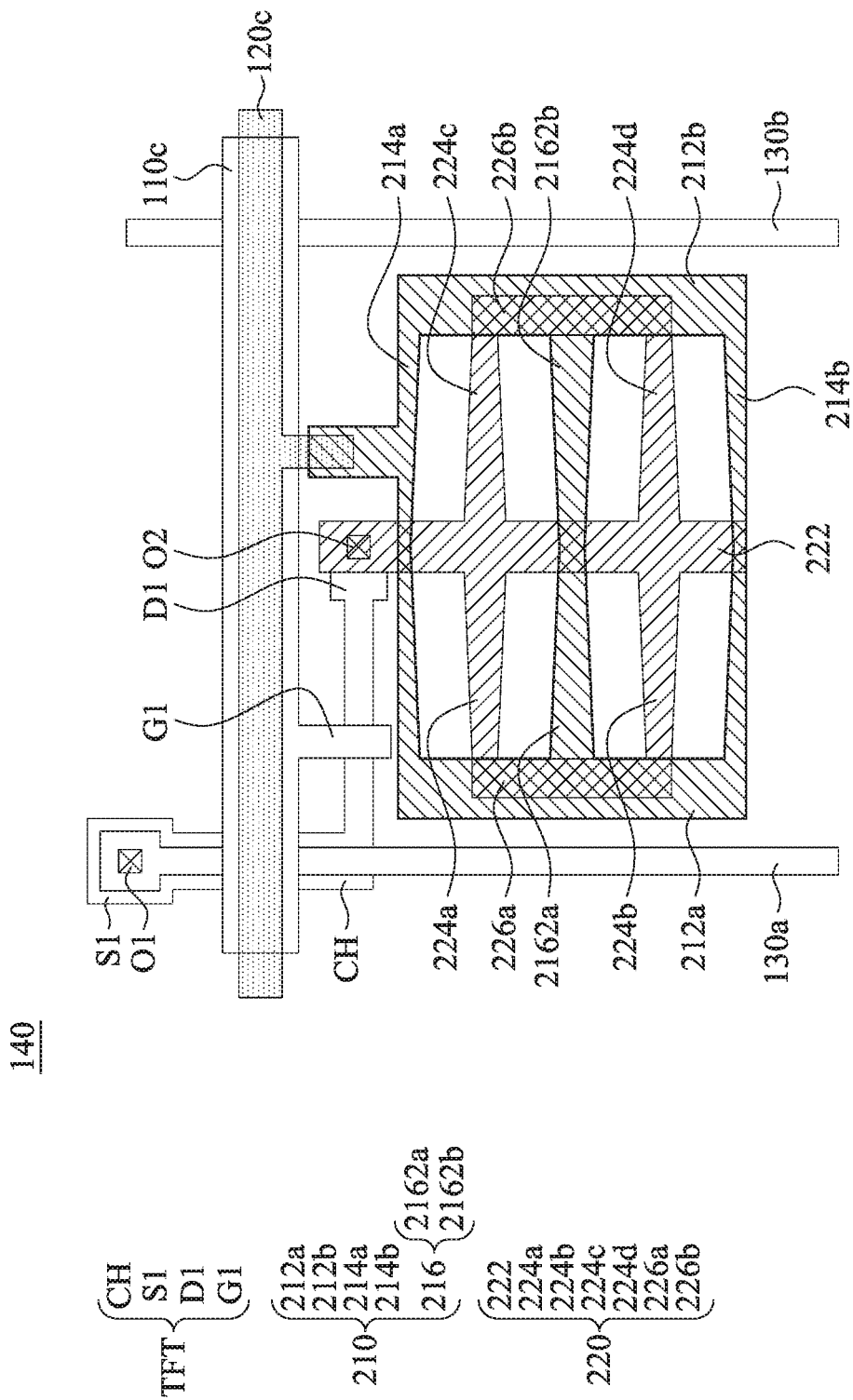
FIG. 2 is a top view diagram of the pixel structure according to one embodiment of the present disclosure.

FIG. 2 is a top view diagram of the pixel structure 140 according to one embodiment of the present disclosure. The pixel structure 140 comprises a switching element TFT, a first electrode 210, and a second electrode 220. The switching element TFT comprises a channel layer CH, a source S1, a gate G1, and a drain D1. An insulating layer is disposed between the gate G1 and the channel layer CH. The channel layer CH is coupled with one of the scan lines 110a-110d (e.g., the scan line 110c). Other insulating layer is disposed on the gate G1, the source S1 is coupled with one of the data lines 130a-130d (e.g., the data line 130a) through a via hole 01, and the via hole 01 penetrates the other insulating layer. The drain D1 is coupled with the second electrode 220 through a via hole 02, and the via hole 02 also penetrates the other insulating layer.

The first electrode 210 is coupled with one of the common voltage lines 120a-120d (e.g., the common voltage line 120c). The first electrode 210 comprises a first main portion 212a, a first main portion 212b, a connection portion 214a, a connection portion 214b, and a girder portion 216. The first main portion 212a and the first main portion 212b are extended essentially in parallel to the first direction D1. In this embodiment, the first main portion 212a and the first main portion 212b are not overlapping with the data lines 130a-130d, but this disclosure is not limited thereto. In one embodiment, the first main portion 212a and the first main portion 212b are partially overlapping with two adjacent ones of the data lines 130a-130d (e.g., the data lines 130a and 130b). In another embodiment, the first main portion 212a and the first main portion 212b completely overlapping with two adjacent ones of the data lines 130a-130d.

The connection portion 214a and the connection portion 214b are extended essentially in parallel to the second direction D2, and are coupled between the first main portion 212a and the first main portion 212b. The width of a left portion of the connection portion 214a decreases in a direction away from the first main portion 212a, and the width of a left portion of the connection portion 214b also decreases in the direction away from the first main portion 212a. The width of a right portion of the connection portion 214a decreases in a direction away from the first main portion 212b, and the width of a right portion of the connection portion 214b also decreases in the direction away from the first main portion 212b. That is, the respective width of the connection portion 214a and the connection portion 214b is widest at the two sides coupled with the first main portion 212a and the first main portion 212b, and is narrowest in the center.

The girder portion 216 is coupled between the first main portion 212a and the first main portion 212b, and is disposed between the connection portion 214a and the connection portion 214b. The girder portion 216 comprises a geometric structure 2162a and a geometric structure 2162b which are mutually coupled. In addition, the geometric structure 2162a and the geometric structure 2162b are coupled with the first main portion 212a and the first main portion 212b, respectively. The width of the geometric structure 2162a decreases in the direction away from the first main portion 212a, and the width of the geometric structure 2162b decreases in the direction away from the first main portion 212b. In this embodiment, the geometric structure 2162a and the geometric structure 2162b are trapezoid-shaped.

An insulating layer is disposed between the second electrode 220 and the first electrode 210, so that the second electrode 220 and the first electrode 210 are mutually electrically isolated. The second electrode 220 comprises a second main portion 222, a plurality of branch portions 224a-224d, an extension portion 226a, and an extension portion 226b. The second main portion 222 is extended essentially in parallel to the first direction D1, and is disposed between the first main portion 212a and the first main portion 212b. The branch portions 224a-224d are extended essentially in parallel to the second direction D2, and are symmetrically coupled with two sides of the second main portion 222. That is, the branch portion 224a and the branch portion 224c are disposed axisymmetrically, and the branch portion 224b and the branch portion 224d are disposed axisymmetrically. The branch portion 224a and the branch portion 224c are disposed between the connection portion 214a and the girder portion 216. The branch portion 224b and the branch portion 224d are disposed between the connection portion 214b and the girder portion 216. That is, the two axisymmetric ones of the branch portions 224a-224d are disposed between one of the connection portions 214a and 214b and the girder portion 216. The width of each of the branch portions 224a-224d decreases in a direction away from the second main portion 222. In this embodiment, each of the branch portions 224a-224d are trapezoid-shaped, but this disclosure is not limited thereto. In one embodiment, each of the branch portions 224a-224d are triangle-shaped.

The extension portion 226a and the extension portion 226b are extended essentially in parallel to the first direction D1. The extension portion 226a is coupled with the branch portion 224a and the branch portion 224b, and the extension portion 226a is coupled with the branch portion 224c and the branch portion 224d. That is, the extension portion 226a is coupled to two of the branch portions 224a-224d which are at the same side of the second main portion 222 as the extension portion 226a, and the extension portion 226b is coupled to the other two of the branch portions 224a-224d which are at the same side of the second main portion 222 as the extension portion 226b. In this embodiment, the extension portion 226a and the extension portion 226b are completely overlapping with the first main portion 212a and the first main portion 212b, respectively, but this disclosure is not limited thereto. In one embodiment, the extension portion 226a and the extension portion 226b are partially overlapping with the first main portion 212a and the first main portion 212b, respectively. In another embodiment, the extension portion 226a and the extension portion 226b are not overlapping with the first main portion 212a and the first main portion 212b.

Reference is made to FIGS. 1 and 2, two adjacent first electrodes 210 in the same row or the same column of the pixel array structure 100 are mutually electrically isolated, so that the pixel array structure 100 may be driven by means of dot inversion. Notably, the aforesaid drawings show four branch portions, but this disclosure is not limited thereto. In some embodiments that the pixel structure 140 has a larger or smaller circuit area, the pixel structure 140 may correspondingly have more or lesser branch portions.

Figure 3:
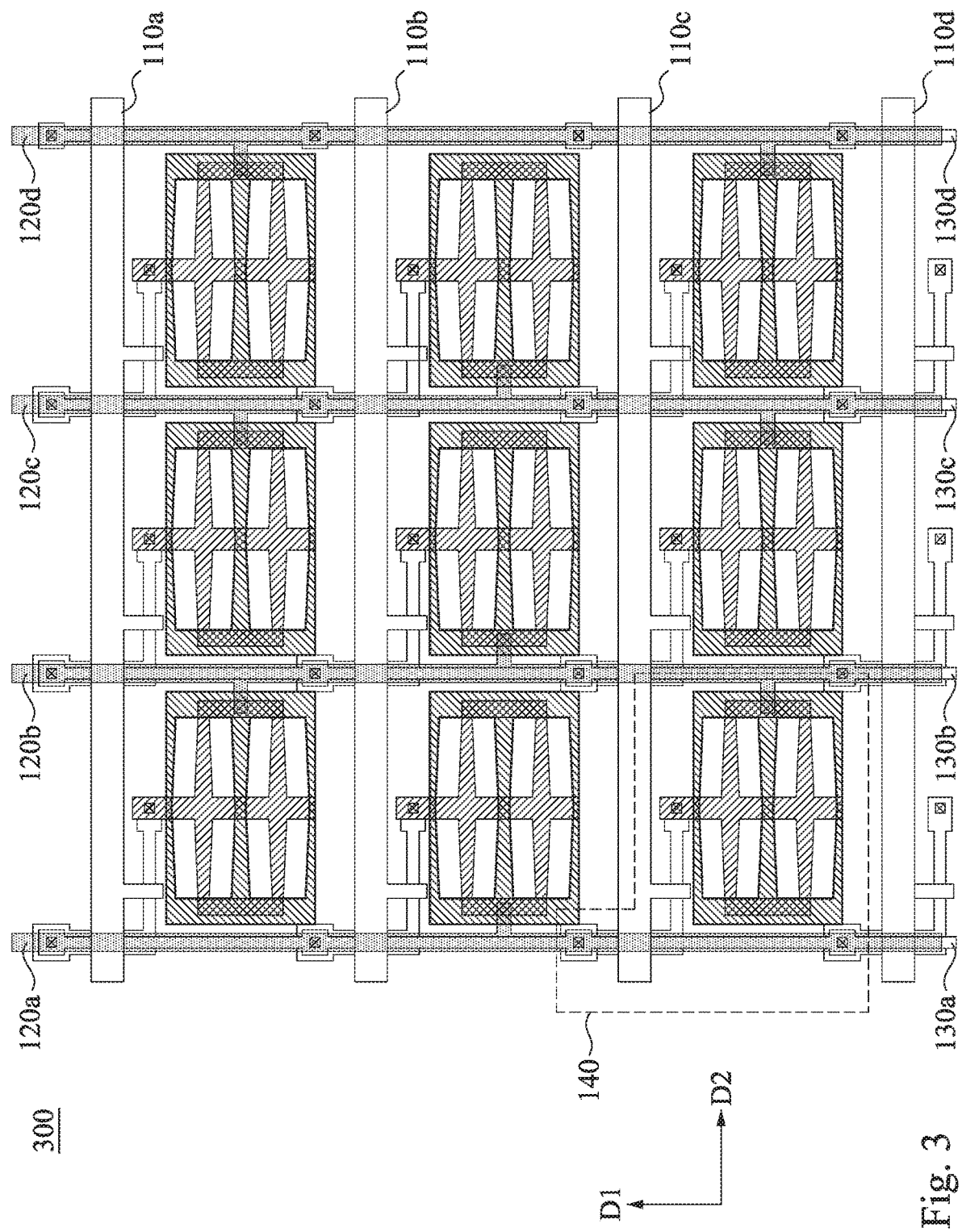
FIG. 3 is a top view diagram of a pixel array structure according to another embodiment of the present disclosure.

FIG. 3 is a top view diagram of a pixel array structure 300 according to one embodiment of the present disclosure. The pixel array structure 300 of FIG. 3 is similar to the pixel array structure 100 of FIG. 1, and the difference is described as follows: the common voltage lines 120a-120d of the pixel array structure 300 are extended essentially in parallel to the first direction D1, and are completely overlapping with the data lines 130a-130d, respectively, but this disclosure is not limited thereto. In one embodiment, the common voltage lines 120a-120d of the pixel array structure 300 are partially overlapping with the data lines 130a-130d, respectively. In another embodiment, the common voltage lines 120a-120d of the pixel array structure 300 are not overlapping with the data lines 130a-130d. Therefore, the pixel array structure 300 may be driven by means of dot inversion. The foregoing descriptions regarding to other corresponding implementations, connections, and operations of the pixel array structure 100 are also applicable to the pixel array structure 300. For the sake of brevity, those descriptions will not be repeated here.

Figure 4:
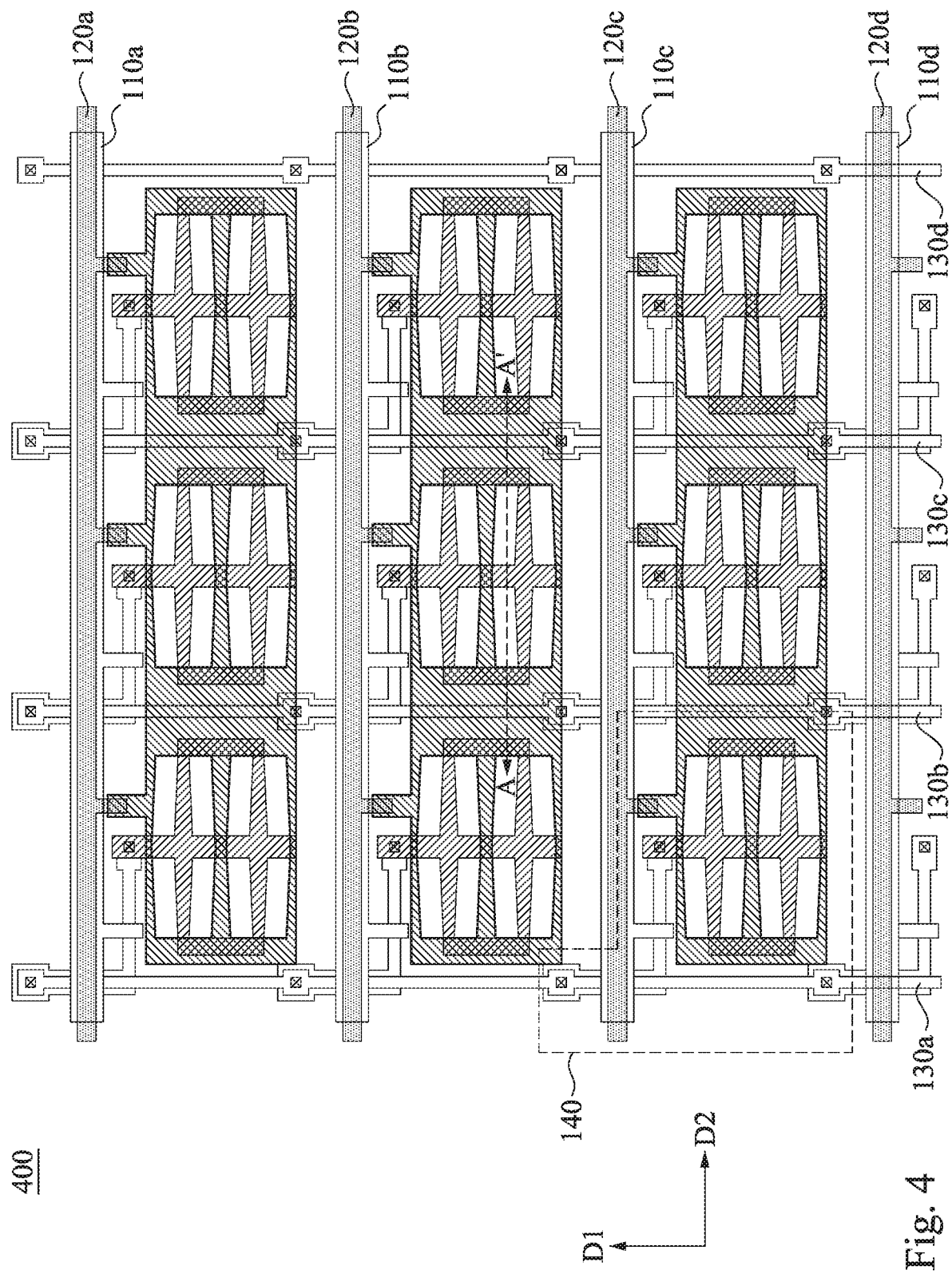
FIG. 4 is a top view diagram of a pixel array structure according to yet another embodiment of the present disclosure.

FIG. 4 is a top view diagram of a pixel array structure 400 according to one embodiment of the present disclosure. The pixel array structure 400 of FIG. 4 is similar to the pixel array structure 100 of FIG. 1, and the difference is described as follows: each of the common voltage lines 120a-120c of the pixel array structure 400 is coupled with a row of pixel structures 140. Another difference between the pixel array structure 400 and the pixel array structure 100 is described as follows: two adjacent first electrodes 210 of the pixel array structure 400, which are in the same row, are mutually coupled, and two first electrodes 210 of the pixel array structure 400, which are in different rows, are mutually electrically isolated. Therefore, the pixel array structure 400 may be driven by means of row inversion.

Figure 5:
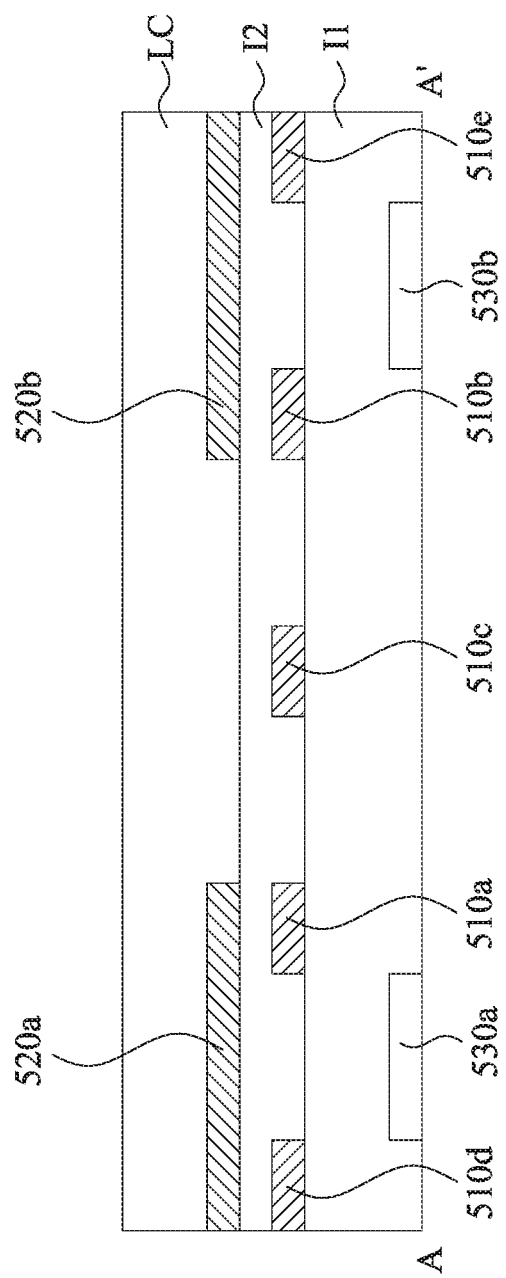
FIG. 5 is a simplified cross-sectional diagram of the pixel array structure of FIG. 4 along the direction AA'.

FIG. 5 is a simplified cross-sectional diagram of the pixel array structure 400 of FIG. 4 along the direction AA'. First conducting layers 510a-510e are formed on a first insulating layer 11. A second insulating layer 12 is formed on the first conducting layer 510a-510e. The first conducting layer 510a, the first conducting layer 510b, and the first conducting layer 510c are respectively corresponding to the extension portion 226a, the extension portion 226b, and the second main portion 222 of the pixel structure 140 overlapping with the direction AA'. The first conducting layer 510d and the first conducting layer 510e are respectively corresponding to the extension portion 226b and the extension portion 226a of the pixel structures 140 which are in the columns adjacent to the pixel structure 140 overlapping with the direction AA'.

A second conducting layer 520a and a second conducting layer 520b are formed on the second insulating layer 12. The liquid crystal layer LC is formed on the second conducting layer 520a and the second conducting layer 520b. In the projection direction, the second conducting layer 520a and the second conducting layer 520b are at least partially overlapping with two of the first conducting layers 510a-510e, respectively. For example, the second conducting layer 520a is at least partially overlapping with the first conducting layer 510a and the first conducting layer 510d in the projection direction. The second conducting layer 520b is at least partially overlapping with the first conducting layer 510b and the first conducting layer 510e in the projection direction.

A third conducting layer 530a and a third conducting layer 530b are formed in the first conducting layer 11. The third conducting layer 530a and the third conducting layer 530b are corresponding to the data line 130b and the data line 130c of FIG. 4, respectively. In the projection, the third conducting layer 530a and the third conducting layer 530b are overlapping with the second conducting layer 520a and the second conducting layer 520b, respectively, and are not overlapping with the first conducting layers 510a-510e, but this disclosure is not limited thereto. In one embodiment, the third conducting layer 530a is partially overlapping with the first conducting layer 510a and the first conducting layer 510d in the projection direction. The third conducting layer 530b is partially overlapping with the first conducting layer 510b and the first conducting layer 510e in the projection direction.

In practice, the first conducting layers 510a-510e and the second conducting layers 520a-520b may be realized by the indium tin oxide (ITO) or by other transparent conducting materials. The third conducting layers 530a-530b may be realized by metal materials. The foregoing descriptions regarding to other corresponding implementations, connections, and operations of the pixel array structure 100 are also applicable to the pixel array structure 400. For the sake of brevity, those descriptions will not be repeated here.

Figure 6:
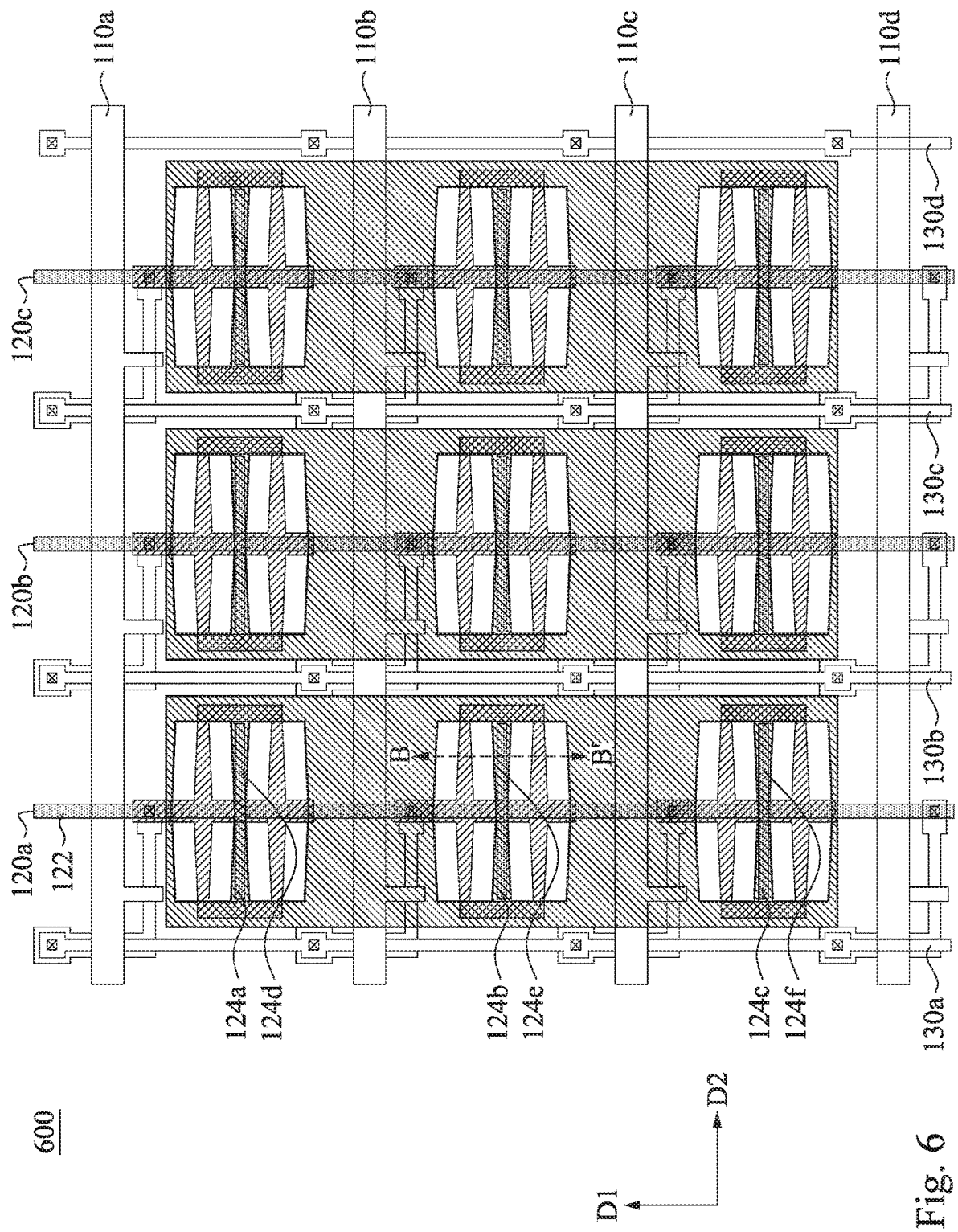
FIG. 6 is a top view diagram of a pixel array structure according to yet another embodiment of the present disclosure.

FIG. 6 is a top view diagram of a pixel array structure 600 according to one embodiment of the present disclosure. The pixel array structure 600 of FIG. 6 is similar to the pixel array structure 100 of FIG. 1, and the difference is described as follows: the common voltage lines 120a-120c of the pixel array structure 600 are extended essentially in parallel to the first direction D1, and is each coupled to a column of pixel structures 140. Another difference between the pixel array structure 600 and the pixel array structure 100 are described as follows: two adjacent first electrodes 210 of the pixel array structure 600, which are in the same column, are mutually coupled, and two first electrodes 210 of the pixel array structure 600, which are in different columns, are mutually electrically isolated. Yet another difference between the pixel array structure 600 and the pixel array structure 100 is described as follows: a plurality of second main portions 222, which are in the same column, of the pixel array structure 600 are overlapping with one of the common voltage lines 120a-120c. Therefore, the pixel array structure 400 may be driven by means of row inversion.

Each of the common voltage lines 120a-120c of the pixel array structure 600 is fishbone shaped. For example, the common voltage line 120a comprises an axis portion 122 and a plurality of convex portions 124a-124f. The axis portion 122 is partially overlapping with a plurality of second main portions 222 in a corresponding column. The convex portions 124a-124f are extended essentially in parallel to the second direction D2, and are symmetrically coupled with two sides of the axis portion 122. For example, the convex portions 124a-124c are respectively axisymmetric with the convex portions 124d-124f. In this embodiment, the axisymmetric two of the convex portions 124a-124f are completely overlapping with the girder portion 216 of a corresponding pixel structure 140, but this disclosure is not limited thereto. In one embodiment, the axisymmetric two of the convex portions 124a-124f are partially overlapping with the girder portion 216 of the corresponding pixel structure 140.

Each of the common voltage lines 120a-120c of the pixel array structure 600 is disposed at an area, which has lower liquid crystal efficiency, of pixel array structure 600. When the pixel array structure 600 emits light, the area having lower liquid crystal efficiency will have lower luminance. In other words, the common voltage lines 120a-120c of the pixel array structure 600 would not shield the areas having higher liquid crystal efficiency, so that the pixel array structure 600 has high transmittance. The foregoing descriptions regarding to other corresponding implementations, connections, and operations of the pixel array structure 100 are also applicable to the pixel array structure 600. For the sake of brevity, those descriptions will not be repeated here.

Figure 7:
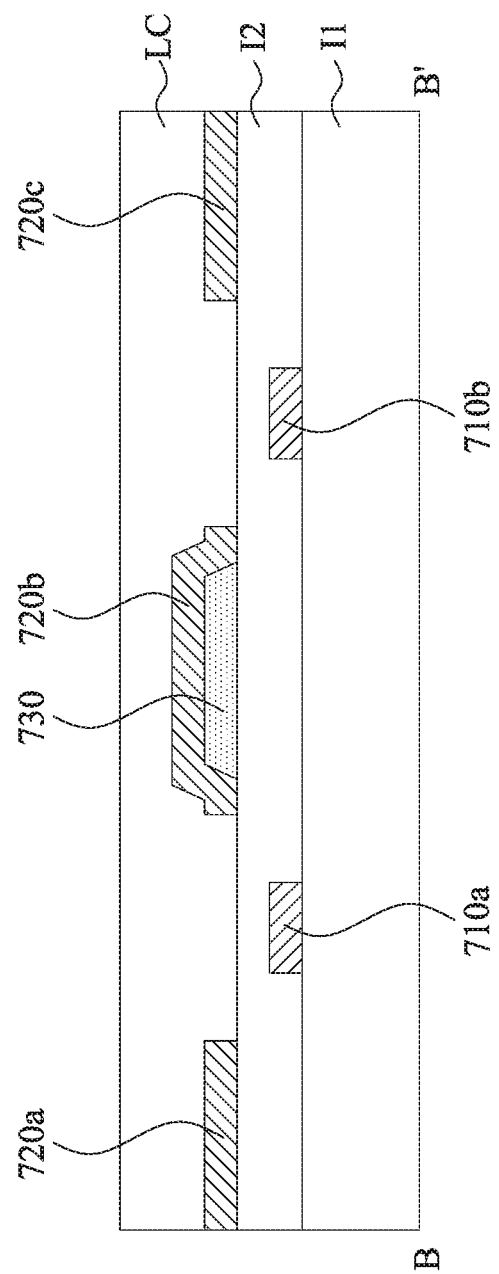
FIG. 7 is a simplified cross-sectional diagram of the pixel array structure of FIG. 6 along the direction BB'.

FIG. 7 is a simplified cross-sectional diagram of the pixel array structure 600 of FIG. 6 along the direction BB'. A first conducting layer 710a and a first conducting layer 710b are formed on the first insulating layer 11. A second insulating layer 12 is formed on the first conducting layer 710a and the first conducting layer 710b. The first conducting layer 710a and the first conducting layer 710b are respectively corresponding to the branch portion 224c and the branch portion 224d of the pixel structure 140 overlapping with the direction BB' of FIG. 6.

Second conducting layers 720a-720c are formed on the second insulating layer 12. A liquid crystal layer LC is formed on the second conducting layers 720a-720c. In the projection direction, the second conducting layers 720a-720c are not overlapping with the first conducting layer 710a and first conducting layer 710b. A fourth conducting layer 730 is formed between the second insulating layer 12 and the second conducting layer 720b, and is directly coupled with the second conducting layer 720b. The fourth conducting layer 730 is corresponding to the convex portion 124e of the pixel structure 140 overlapping with the direction BB' of FIG. 6. Notably, in the aforementioned embodiments, the common voltage line is directly coupled with a corresponding second electrode.

Each of the aforesaid FIGS. 1, 3, 4, and 6 shows a 3×3 matrix, but this disclosure is not limited thereto. Number of the pixel structures 140 corresponding to FIGS. 1, 3, 4, and 6 may be designed according to practical requirements, so that, in some embodiments, the pixel array structure 100, the pixel array structure 300, the pixel array structure 400, and the pixel array structure 600 may comprise more or lesser pixel structures 140.

Accordingly, the first electrode 210 comprises the girder portion 216, the connection portion 214a, and the connection portion 214b, and the second electrode 220 comprises the branch portions 224a-224d. Moreover, the girder portion 216, the connection portion 214a, and the connection portion 214b are arranged alternatively with the branch portions 224a-224d. Therefore, an electrode field formed by the first electrode 210 and the second electrode 220 can shorten the response time of the liquid crystal, and render the liquid crystal have higher transmittance.

Figure 8:
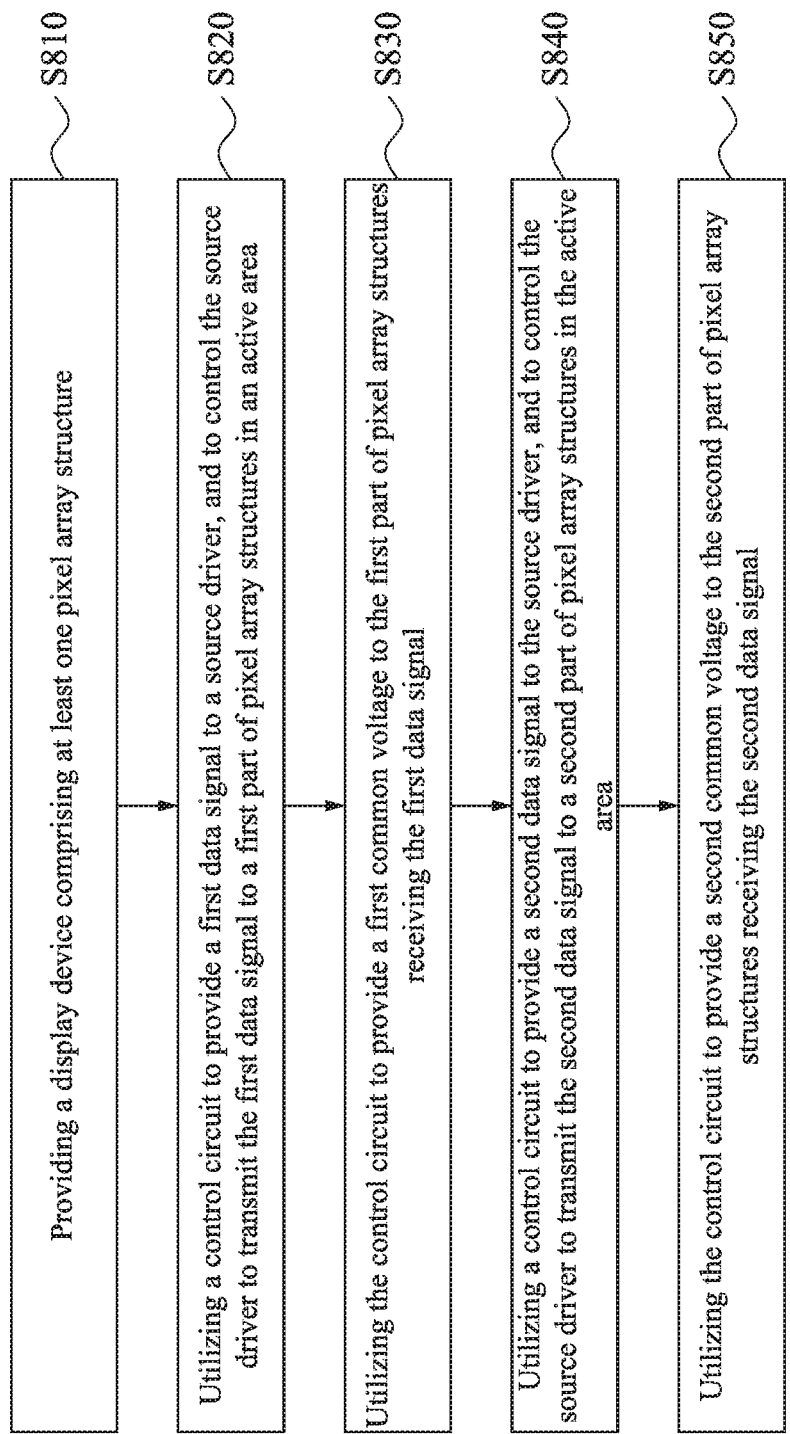
FIG. 8 is a flow chart of a driving method according to one embodiment of the present disclosure.
Figure 10:
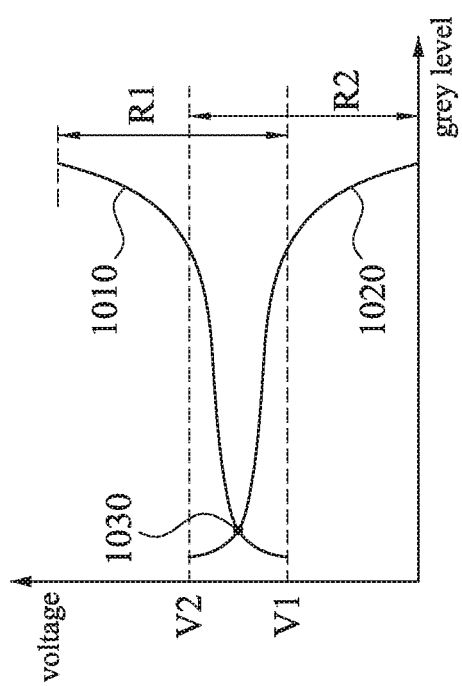
FIG. 10 is a schematic diagram for illustrating grey level characteristics of the display device.
Figure 9:
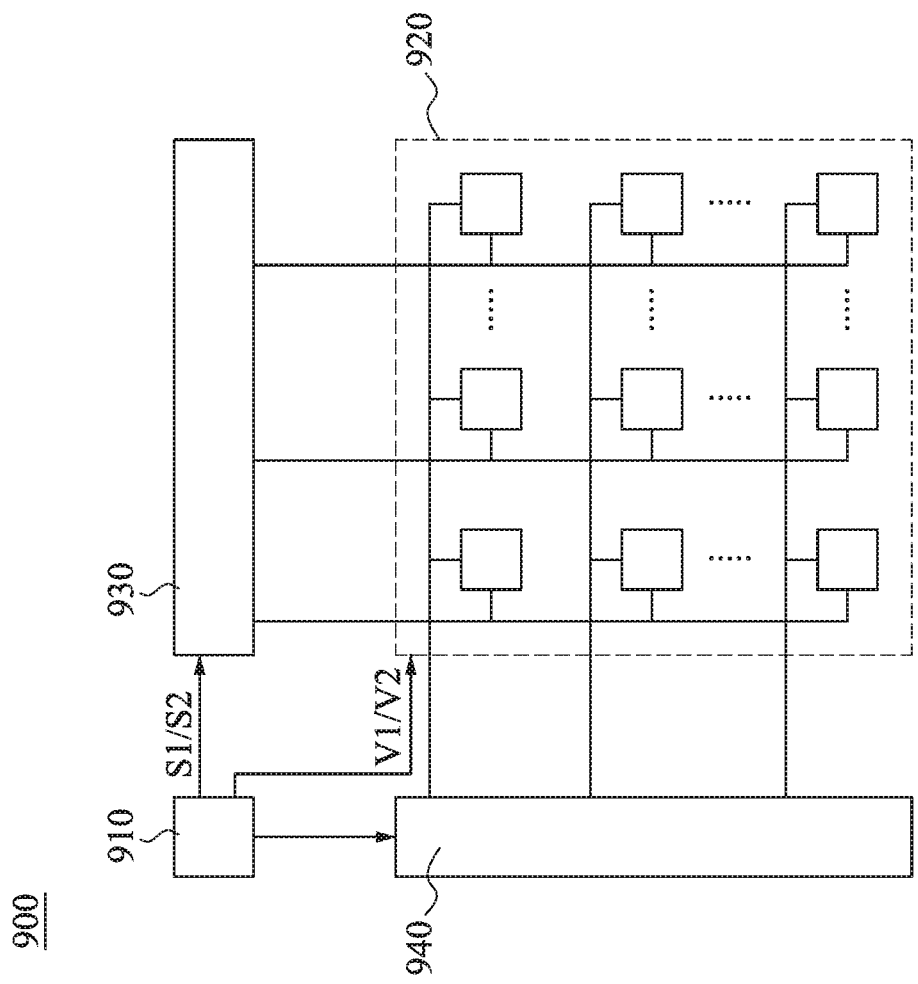
FIG. 9 is a simplified functional block diagram of a display device according to one embodiment of the present disclosure.

FIG. 8 is a flow chart of a driving method 800 according to one embodiment of the present disclosure. FIG. 9 is a simplified functional block diagram of a display device 900 according to one embodiment of the present disclosure. The display device 900 comprises a control circuit 910, an active area 920, a source driver 930, and a gate driver 940. FIG. 10 is a schematic diagram for illustrating grey level characteristics of the display device 900.

Reference is made to FIGS. 8 and 9, the display device 900 is provided in operation S810. The active area 920 comprises at least one of the aforesaid pixel array structure 100, pixel array structure 300, pixel array structure 400, or pixel array structure 600.

In operation S820, the control circuit 910 provides, in an analog form, a first data signal S1 to the source driver 930. The control circuit 910 further controls the source driver 930 to transmit the first data signal S1 to a first part of the pixel structures 140 in the active area 920.

In operation S830, the control circuit 910 provides a first common voltage V1 to the first part of pixel structures 140 receiving the first data signal S1, so that the first part of pixel structures 140 will apply voltages with a first polarity (e.g., the positive polarity) to the liquid crystal.

In operation S840, the control circuit 910 provide, in the analog form, a second data signal S2 to the source driver 930. The control circuit 910 further controls the source driver 930 to transmit the second data signal S2 to a second part of pixel structures 140 in the active area 920. The second part of pixel structures 140 will apply voltages with a second polarity (e.g., the negative polarity) to the liquid crystal. In detail, the control circuit 910 may transmit the first data signal S1 and the second data signal S2 to the second electrodes 220 of the pixel structures 140.

In operation 850, the control circuit 910 provides a second common voltage V2 to the second part of pixel structures 140 receiving the second data signal S2, so that the second part of the pixel structures 140 will apply voltages with the second polarity (e.g., the negative polarity) to the liquid crystal.

Please refer to FIG. 10, a curve 1010 and a curve 1020 show grey level characteristics of the first data signal S1 and the second data signal S2, respectively. The first data signal S1 has a first voltage range R1 defined by two ends of the curve 1010. The second data signal S2 has a second voltage range R2 defined by two ends of the curve 1020. The first common voltage V1 is equal to a minimum value of the first voltage range R1. The second common voltage V2 is equal to a maximum value of the second voltage range R2. Notably, the minimum value and the maximum value of the first voltage range R1 are respectively corresponding to a lowest grey level (e.g., 0 grey level) and a highest grey level (e.g., 255 grey level) of the display device 900. The minimum value and the maximum value of the second voltage range R2 are respectively corresponding to the highest grey level and the lowest grey level of the display device 900.

In addition, an intersection point 1030 exists between the curve 1010 and the curve 1020, and the intersection point 1030 is corresponding to a non-zero grey level. In addition, the maximum value of the first voltage range R1 is larger than the maximum value of the second voltage range R2. The minimum value of the first voltage range R1 is larger than the minimum value of the second voltage range R2.

In other words, the first voltage range R1 and the second voltage range R2 are partially overlapped. Therefore, the display device 900 is capable of using larger voltage differences to control the liquid crystal in both of the positive polarity frames and the negative polarity frames, so that the display device 900 has a higher contrast ratio.

The execution orders of the operations of FIG. 8 is merely an exemplary embodiment, and is not intend to restrict the practical implementations of this disclosure. In one embodiment, operation S820 and operation S830 may be conducted simultaneously, and operation S840 and operation S850 may be conducted simultaneously. In another embodiment, operation S820 through S850 may be conducted simultaneously.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The size and relative sizes of some of the elements shown in drawings may be enlarged, or the shapes of some of the elements may be simplified so that the contents of the embodiments can be more clearly expressed. Therefore, the shapes, sizes, relative sizes and relative positions of the various elements in the drawings are merely illustrative and should not be used to limit the scope of the claims of the present disclosure. In addition, the present disclosure may be embodied in many different forms, and the explanation of the present disclosure should not be limited to the embodiments provided by the present disclosure.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A driving method, comprising:
    providing a display device, wherein the display device comprises a pixel array structure as in comprising:
        a plurality of data lines, extended along a first direction;
        a plurality of scan lines, extended along a second direction; and
        a plurality of pixel structures, wherein each of the plurality of pixel structures comprises:
            a switching element, coupled with the scan line and the data line;
            a first electrode, comprising:
                two first main portions, essentially parallel to the first direction;
                a girder portion, coupled between the two first main portions; and
                two connection portions, coupled between the two first main portions, wherein the girder portion and the two connection portions are essentially parallel to the second direction, and the girder portion is disposed between the two connection portions; and
            a second electrode, electrically isolated from the first electrode, comprising:
                a second main portion, essentially parallel to the first direction;
                a plurality of branch portions, symmetrically coupled with the second main portion; and
                two extension portions, essentially parallel to the first direction, wherein each of the two extension portion is coupled with at least two of the plurality of branch portions;
    providing a first data signal to a first part of pixel structures of the plurality of pixel structures; and
    providing a second data signal to a second part of pixel structures of the plurality of pixel structures, wherein the first data signal and the second data signal have a first voltage range and a second voltage range, respectively,
    wherein a minimum value and a maximum value of the first voltage range are respectively corresponding to a lowest grey level and a highest grey level of the display device, and a minimum value and a maximum value of the second voltage range are respectively corresponding to the highest grey level and the lowest grey level,
    wherein the first voltage range is partially overlapping with the second voltage range.

2. The driving method of claim 1, wherein the maximum value of the first voltage range is larger than the maximum value of the second voltage range, and the minimum value of the first voltage range is larger than the minimum value of the second voltage range.

3. The driving method of claim 1, further comprising:
    providing a first common voltage to the first part of pixel structures; and
    providing a second common voltage to the second part of pixel structures, wherein the second common voltage is higher than the first common voltage.

* * * * *